United States Patent [19]

Roeschlein

[11] Patent Number: 4,985,874
[45] Date of Patent: Jan. 15, 1991

[54] SOLID STATE SEQUENCING SWITCH

[75] Inventor: Eugene R. Roeschlein, Indianapolis, Ind.

[73] Assignee: The United States of America, as represented by the Secretary of the Navy, Washington, D.C.

[21] Appl. No.: 137,599

[22] Filed: Apr. 26, 1971

[51] Int. Cl.⁵ .............................................. G01S 3/80
[52] U.S. Cl. .................................................. 367/122
[58] Field of Search ................ 340/6 R, 16 R, 3 R; 343/100 SA; 367/118, 119, 126, 122

[56] References Cited

U.S. PATENT DOCUMENTS 3,579,180  5/1971  Taddeo ............................ 367/122

Primary Examiner—Thomas H. Tarcza
Assistant Examiner—Daniel T. Pihulic
Attorney, Agent, or Firm—John Becker; Harvey David; Sol Sheinbein

[57] ABSTRACT

A combination of integrated circuit (IC) flatpacs used in combination to switch selected sonar microphone inputs from a circular receiving array to position a beam containing a sounding target intermediate to an equal number of left and right microphone pickups and selectively switching through weighted delay circuits for beam forming to present the target in this receiving beam electronically on a flat display with digital control of "coarse" seven and one-half degrees and "fine" one-tenth degree increments to provide a display of the bearing of the target.

6 Claims, 5 Drawing Sheets

DUAL EXPANDABLE 4 LINES OUT OF 6
ANALOG SWITCHING MATRIX

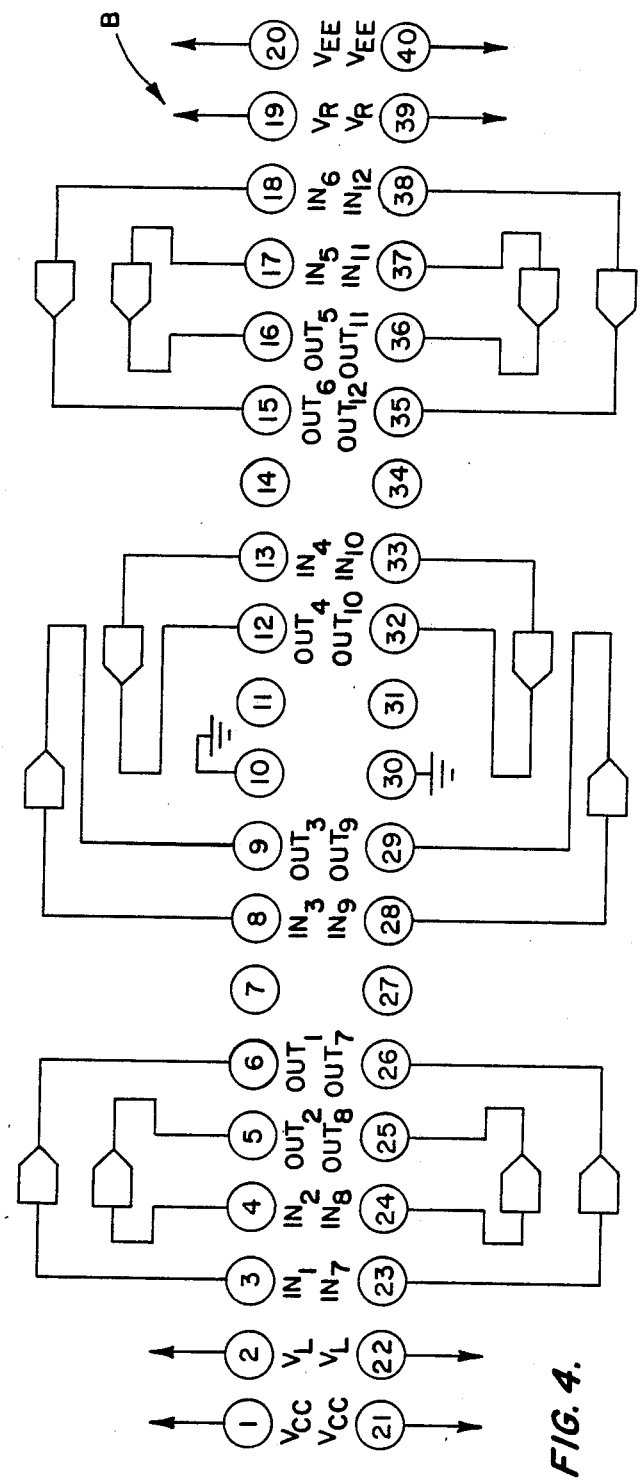
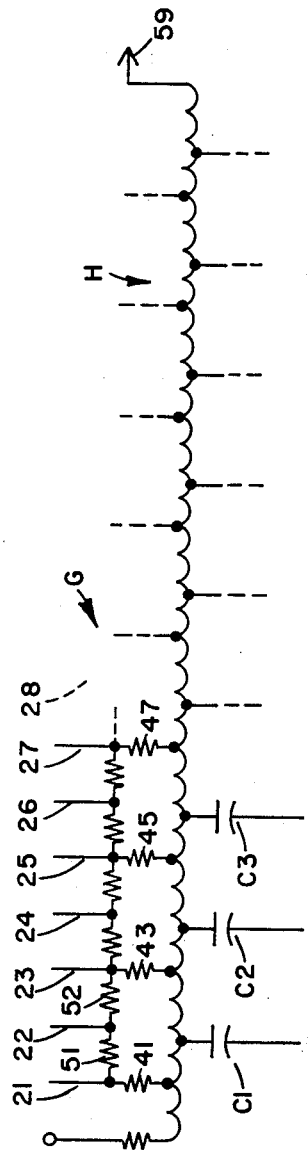
FIG. 4.
FIG. 5.

SOLID STATE SEQUENCING SWITCH

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to inner space target detection where a sound detection system of sonar is positioned in an inner space vehicle or at an inner space station.

In prior known sonar devices of this type a plurality of sonar microphones are positioned about the vehicle or station such as in a circular configuration of sonar microphones arranged to listen through 360° which microphones had to be switched in a desirable way to provide bearing of the target in the inner space. The prior known switching device was a mechanical rotary switch utilizing a plurality of brushes on slip ring and commutator style contacts to provide the desired combination of switch arrangement to connect the sonar microphones in the proper combination to the correct taps of delay lines to form a beam or beams at this bearing. The mechanical switching arrangement of this known type is most successful in operation but its operation is limited to a few hours since the mechanical switch contacts deteriorate rapidly and require frequent cleaning operations which shut down the equipment during these cleaning operations. Accordingly, it is desirable to eliminate such mechanical switching means since cleaning at intervals of time is inherent in such switches and it is desirable to mechanize such a switching system with non-mechanical or electronic, preferably solid state switching arrangements. Additionally, the accuracy of the mechanical switches is dependent on and limited by the mechanical dimensions and their stability with time.

SUMMARY OF THE INVENTION

In the present invention solid state IC flatpacs of various types available on the open market from industry are used for switching desirable groups of sonar microphones into the beam forming circuit for the detection and evaluation of a target in the inner space and displayed on a display console for evaluation. These solid state flatpacs switching means do not deteriorate through time or usage and never require cleaning or other attention thereby avoiding any shutdown time of the equipment. Present day solid state IC flatpacs are very reliable allowing continuous use for sonar detection and they require much less space and are of much less weight than the mechanical switches they replace. It is therefore a general object of this invention to provide a solid state switching means for selectively switching in circuit the appropriate sonar microphones of a plurality of such microphones to a delay line beam, former arrangement to precisely display the target position for target detection and evaluation.

BRIEF DESCRIPTION OF THE DRAWINGS

These and other objects and the attendant advantages, features, and uses will become more apparent to those skilled in the art as a more detailed description proceeds when considered along with the accompanying drawings in which:

FIG. 3 illustrates the two sides of a dual flatpac switching array module and a typical FET switch element, FIG. 3a;

FIG. 4 illustrates in circuit schematic and terminal connections the three section part of a single FET switch driver module;

FIG. 5 illustrates in partial circuit schematic a resistor bank and delay line used in FIG. 1.

DESCRIPTION OF THE PREFERRED EMBODIMENT

Figure 1:
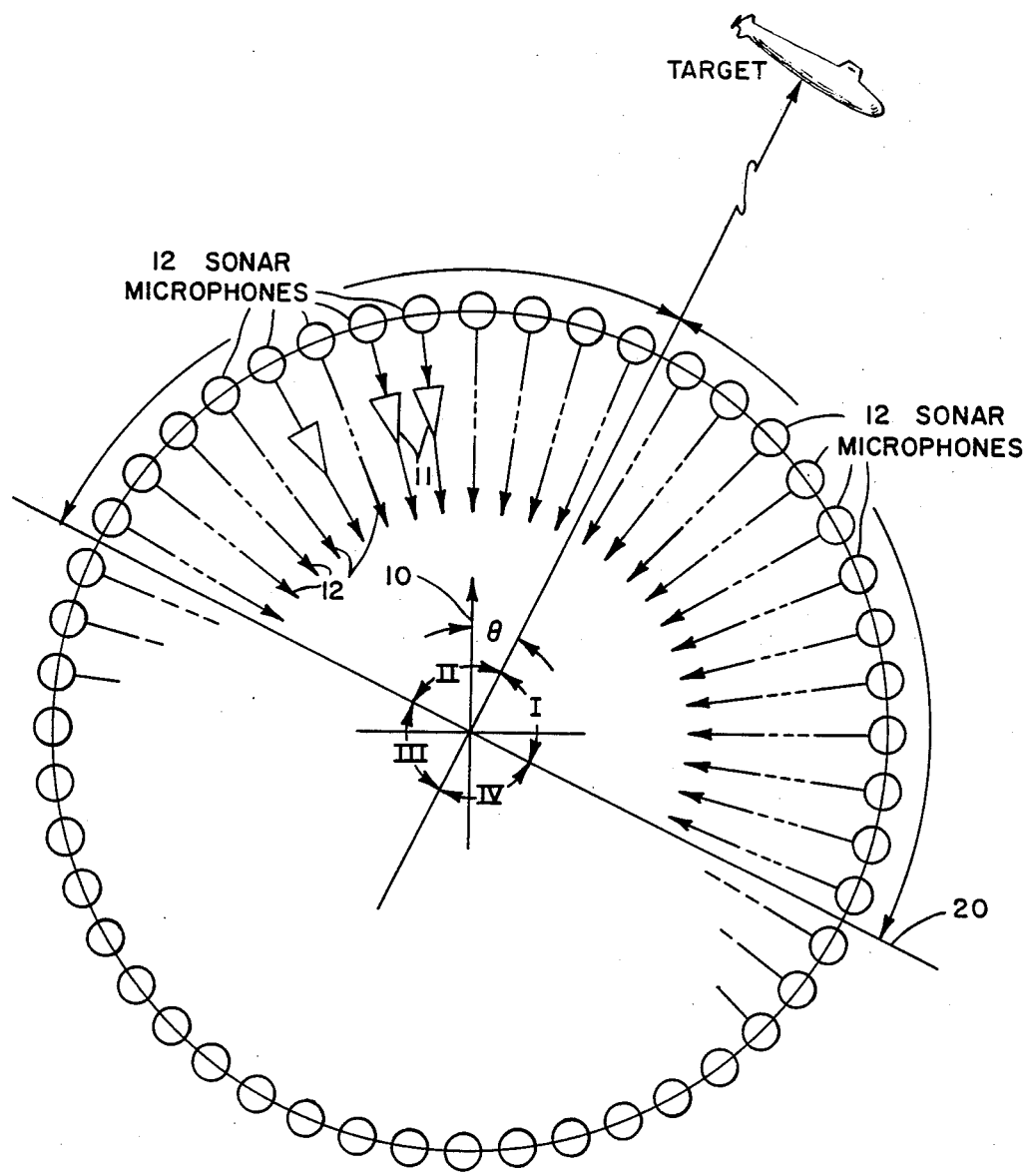
FIG. 1 illustrates a circular array of sonar microphones as found on a carrying vehicle such as a submarine.

Referring more particularly to FIG. 1 a circular arrangement of sonar microphones is used on an inner space vehicle, such as a submarine or the like, and for the purpose herein is described as having a heading in the direction of the arrow 10. The sonar microphones are arranged around the inner space vehicle and preferably in some circular arrangement and may be thought of as arranged in quadrants I, II, III, IV, with reference to the steered direction of the beam each quadrant in this example having twelve sonar microphones or 48 microphones in all although other amounts of sonar microphones may be used in the array where desired for particular uses. By using 48 microphones the microphones will be positioned approximately $7\frac{1}{2}°$ apart throughout the complete circular configuration. The switching mechanism of this invention is to switch out one-half (quadrants III & IV) of the 48 sonar microphones when a beam is formed and is to switch in 12 sonar microphones on each side (quadrants I & II) of the target bearing although quadrants I & IV and II & III may be combined and used as quadrants I & II, if desired. As shown by way of example in FIG. 1, the beam is to be formed on a bearing between quadrants I & II at a bearing angle of zero degrees from the longitudinal center line 10 of the inner space vehicle carrying the detection equipment. Each sonar microphone output is passed through a preamplifier 11 to output conductors 12 to the equipment shown in FIG. 2.

Figure 2:
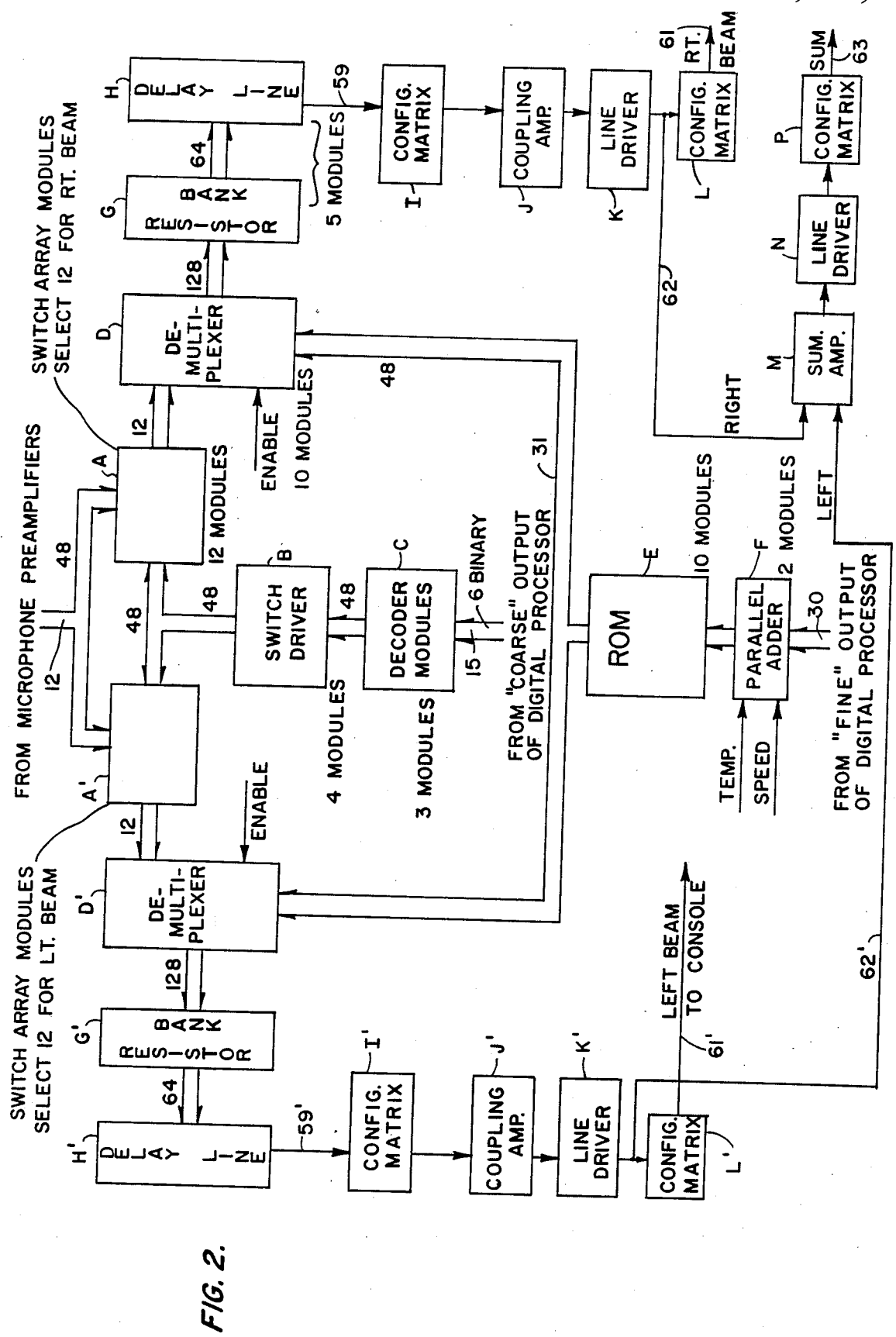
FIG. 2 is a block circuit schematic of the invention showing information flowing in the direction of arrows.
Figures 3, 3A:
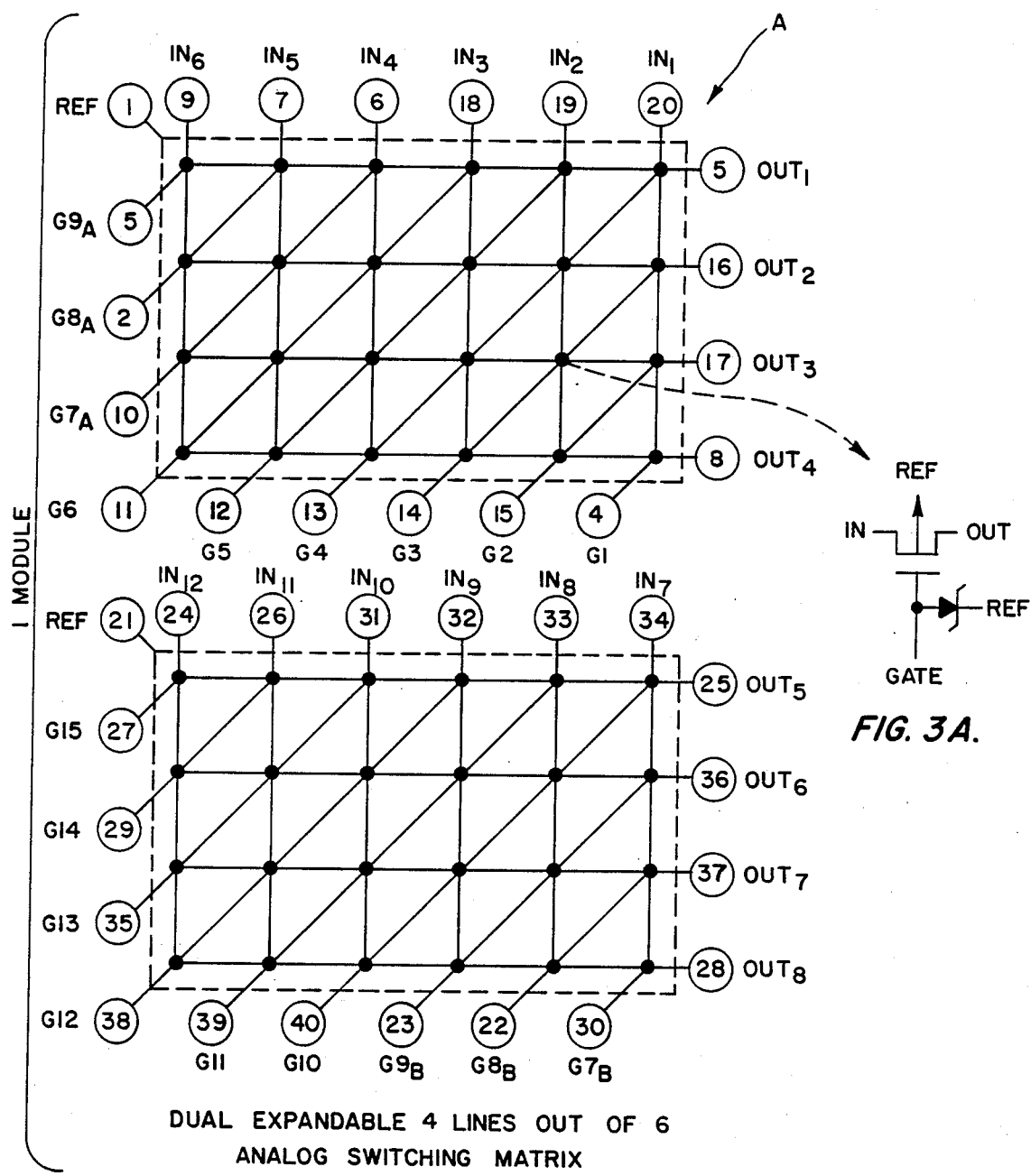

Referring more particularly to FIG. 2 and to the other figures where it is appropriate to describe the block modules of this figure, all 48 outputs from the sonar microphones are applied as inputs 12 in common to a switch array module A for the right beam and the switch array module A' for the left beam. Since each switching array module is identical, only one module will be described herein. Block A consists of 12 modules of six-channel metal oxide semiconductor-field effect transistors (MOS-FETs) which may be purchased on the open market from Siliconix, Inc. and identified by part number G418L. The matrix of these modules may be better understood by reference to FIG. 3 in which the 48 inputs are connected to the IN terminals, IN1 through IN12 of the MOS-FETs, each module shown in FIG. 3 having a like number of gate terminals G1 through G12. These 12 modules are arranged and coupled together such as 4 modules across and 3 modules deep to provide the 48 inputs and the 48 gating circuits with 12 outputs shown on the right, OUT 1 through OUT 6, with three rows of modules constituting 12 outputs in all.

Figure 6:
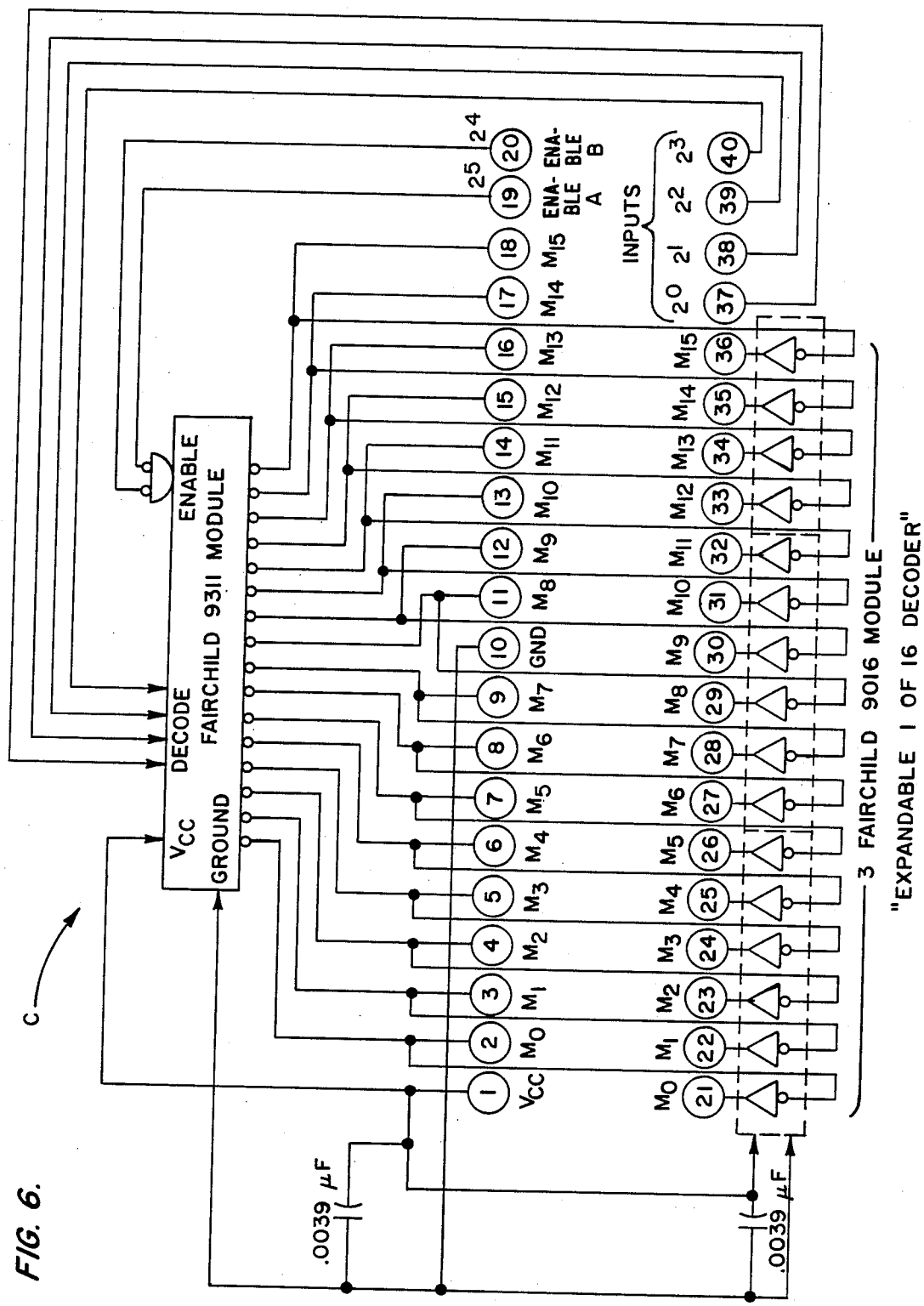
FIG. 6 illustrates one decoder module used in FIG. 1.

The 48 gating terminals for the switch array modules A and A' are provided from a switch driver modules circuit B consisting of 4 modules of 12, FET switch drivers, as shown more particularly in FIG. 4, in which each module consists of substantially 3 sections. The module shown in FIG. 4 is a commercial production made and sold by Siliconix, Inc. and identified under part number D430L. Each module has 12 inputs, IN1 through IN12 and 12 outputs OUT 1 through OUT 12 providing 48 inputs and 48 outputs for the 4 modules used. The 48 outputs of the switch driver modules B are coupled individually to the 48 gate inputs of the switch array modules A and A'. The switch driver modules are controlled from the outputs of 3 decoder modules C, more particularly illustrated in FIG. 6, which are productions of the Fairchild Company identified as Fairchild modules 9311 and 9016 which have binary outputs of $2^4$ or equivalent to 16 outputs for each of three modules to yield 48 of these outputs to control the 48 switch driver modules in block B in accordance with the decoding of a "coarse" binary control input 15 from a digital processor of the sonar system. The 6 binary coded digital processor "coarse" outputs are applied as inputs to the $2^0$ to $2^3$ and the two enable inputs A and B in FIG. 6. Accordingly, the 6 binary inputs for the "coarse" output of the digital processor controls the decoder and the switch driver to the gating circuits of the switch array modules A and A' to select the 12 sonar microphone outputs to the right beam in switch array A and the 12 sonar microphone outputs to the left of the target beam in FIG. 1 determining the angle $\theta$. This "coarse" selection 12 to the left and 12 to the right of the line of sight to the target will select a target within $7\frac{1}{2}°$ of accuracy.

Each switch array A and A' applies the 12 right beam and 12 left beam sonar outputs, respectively, to de-multiplexer circuits D and D' each of which consist of 16 module flatpacs in which each module provides two demultiplexers. These demultiplexer flatpacs are produced by the Fairchild Company and are identified by the part number 3708 which receives the 12 sonar microphone inputs selected by the block A to produce 128 outputs to a resistor bank represented in FIG. 1 as G and G'. The demultiplexers D and D' are controlled from a "fine" output of the digital processor of the system through a parallel adder F and a read only memory (ROM) E providing 48 outputs in parallel to each of the demultiplexers D and D'. The "fine" angle information from the "fine" digital output processor circuit by way of input 30 is to the parallel adder F also having temperature and speed inputs used to access separate areas for different switching patterns stored in the ROM circuit E. The ROM consists of 10 module flatpacs which are available from the National Company part number MM 523 which interfaces with the Fairchild Company module flatpacs 9109 and 9112. These switching patterns from the "fine" output digital processor through the parallel adder F are stored in the ROM, identified by E herein, which produces approximately 75 digital words as a coded output over the conductor means 31 to the demultiplexer units D and D' to channel the 12 sonar hydrophone inputs to the demultiplexer to the resistance banks G and G' which reduces the angular consideration of the sonar microphone inputs to one-tenth of a degree beam forming increments.

This is accomplished by the resistance networks G and G' and the delay lines H and H' only one each of which is shown in FIG. 5 herein. As shown in FIG. 5, each resistance line 21 is coupled to the delay line through a resistor 41, the input 23 is coupled through resistor 43, the input 25 is coupled through resistor 45, etc., throughout the resistance bank. By utilizing equal resistors 51,52 between the inputs 21 and 23 to provide the input tap 22, the intermediate positions in electrical analog voltage can be put into the delay line producing the "fine" consideration control of the target over a $1/10°$ angular spacing to produce formed beams in $1/10°$ increments. Each resistor bank and delay line G,H and G',H' consists of 5 modules or flatpacs each to receive the 128 inputs from the respective demultiplexer. The delay line outputs 59 and 59' are each coupled through a configuration matrix I (and I'), through a coupling amplifier J (and J'), through line drivers illustrated by the blocks K (and K'), and again through configuration matrix L (and L') to provide right and left beam outputs 61 and 61' for the sonar console display and subsequent digital processing. The output of the configuration matrixes L and L' over the conductor 61 and 61' for the right beam (quadrant I) and (quadrant II) are passed to a circuit not shown nor being a part of this disclosure wherein the two signals are amplified and cross-correlation detected in such a manner so as to form an error signal (positive or negative) when the target is not on boresight or the array centered perpendicular to line 20 of FIG. 1. This error signal is then processed in the digital processor (not shown) and the digital control signals "coarse" and "fine" are readjusted to cause the formed beams to move to a position of lesser error signal. The outputs from the line driver K and K' are passed over the conductor means 62 and 62' to a summing amplifier M. The right and left signals are summed in the summing amplifier M and passed through a line driver circuit N and through a configuration matrix P to produce a sum output on conductor 63 which is also passed to the system console for display and analysis. Accordingly, all switching of the sonar microphone output receiving target audio signals are by electronic means requiring no cleaning or down time, and having no moving parts to fail.

The configuration matrices I,I', L,L', and are not essential to the invention and could be eliminated from the combination shown and described without destroying the results. The configuration matrix is purely a block of solid state switches which can be switched or preset to switch the signals in a predetermined way to provide flexibility and for test purposes. The signals on the input to these blocks can be thought of as passing straight through.

OPERATION

In the operation of this device let it be assumed that an inner space vehicle is carrying the circular array of sonar microphones as shown in FIG. 1 and that a beam is to be formed and a target is to be detected at an angle $\theta$ from the longitudinal center line 10 of the inner space vehicle thus placing the target between quadrants I and II of the antenna array. All 48 outputs of the sonar microphones will be applied in parallel to the switch array modules A and A' and the "coarse" output of the digital processor operating through the decoder modules C and switch driving modules B wil gate the switch arrays A and A' to pass the outputs of the 12 sonar microphones immediately to the right of the target in FIG. 1 to the demultiplexer D and the 12 sonar microphone outputs immediately to the left of the target to the demultiplexer D'. The "fine" output of the digital processor of the system operative through the parallel adder F and read-only memory E will be applied in parallel to the demultiplexer D and D' to produce 128 outputs each to the respective resistance banks and delay line modules G,H and G',H' to produce summed and delayed analog voltages (formed beams) on the outputs 59 and 59' coupled through I, J, K, and L and I', J', K', and L' to produce the right and left beam analog voltages on the outputs 61 and 61' to the analog and digital processor (not shown) to generate an error voltage and then a correction in the "coarse" and "fine" adjustments of the digital processor. Each of these analog voltages is also summed in the summing amplifier M and applied through N and P as a summing output 63 to the digital processor in accomplishing the correction of the error voltage in the "coarse" and "fine" outputs thereof to maintain an accuracy of the target with respect to the longitudinal center line by the angle $\theta$ within one-tenth of a degree.

While many modifications may be made in the constructional details by the use of comparable module flatpacs from various companies, the modules described herein and identified by their commercial numbers are given by way of example to illustrate the invention in accomplishing the switching of the sonar microphone outputs and the selection of these outputs entirely by solid state means, and I desire to be limited in the spirit of my invention only by the scope of the appended claims.

I claim:

1. A solid state sequencing switch in a digital processing system of a sonar detector comprising:
    a plurality of sonar microphones equidistantly spaced about a circle on a vehicle station;
    two channels, each channel having a switch array module, a demultiplexer, a resistance bank, a delay line, a configuration matrix, a coupling amplifier, and a line driver in series in that order with said plurality of sonar microphone outputs coupled in common as inputs to each switch array module, and the output of each channel taken from each line driver to provide left and right beam signal voltages on said outputs;
    decoder modules coupled through switch driver modules to said switch array modules in each channel in parallel, said decoder modules adapted to be coupled to the "coarse" output of the digital processor to produce selection of sonar microphones nearest the axis to a noise making target;
    a read only memory to store the switching instructions and having as an input the "fine" output of the digital processor and having the coded outputs coupled in parallel to each demultiplexer;
    a parallel adder having an output coupled to said read only memory input and an input adapted to be coupled to the "fine" output of the digital processor to access portions of the read only memory which store the switching instructions for various sound velocities;
    a summing amplifier having two inputs coupling, respectively, the left and right channel outputs and having an output; and
    a configuration matrix coupling the outputs of each said first and second channels after beam forming and said summing amplifier to provide left beam, right beam, and the sum of the beam voltages as outputs for a display console whereby a sounding target will be displayed as to its position with respect to said vehicle station.

2. A solid state sequencing switch as set forth in claim 1 wherein
    said switch array module in each channel consists of twelve MOS-FET dual sided modules, each side having 6 inputs and 4 outputs, each said individual MOS-FET switch unit having a source input, a drain output, and a gate terminal.

3. A solid state sequencing switch as set forth in claim 1 wherein
    said demultiplexer consists of ten flatpac modules to receive the twelve outputs from said switch array module to produce 128 outputs.

4. A solid state sequencing switch as set forth in claim 3 wherein
    said decoder modules consists of three flatpac modules receiving said coarse output from the digital processor to produce 48 outputs passed through said switch driver modules to control switching of 48 switches in said switch array modules in each channel to select 12 right and 12 left sonar microphone signals to an axis to which a sounding inner space target is nearest.

5. A solid state sequencing switch as set forth in claim 4 wherein
    said resistance bank and delay line comprise a network of resistors in series having said 12 inputs thereto applied consecutively to the resistor junctions with said 64 outputs taken from alternate junctions, each through a resistor to a like number of terminals on said delay line and the outputs of said delay line being an analog voltage.

6. A solid state sequencing switch as set forth in claim 5 wherein
    said parallel adder comprises of two flatpac modules coding said "fine" signal intelligence from said digital processor into eight outputs to said read only memory in digital form to code said read only memory in its output of approximately 75 digital words to choose the 128 signals in said demultiplexer for the outputs therefrom.

* * * * *